United States Patent
Ohashi

(10) Patent No.: US 11,075,393 B2
(45) Date of Patent: Jul. 27, 2021

(54) FUEL CELL SYSTEM, MOBILE OBJECT, AND EXHAUST GAS DISCHARGE CONTROL METHOD

(71) Applicant: TOYOTA JIDOSHA KABUSHIKI KAISHA, Toyota (JP)

(72) Inventor: Yasuhiko Ohashi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 82 days.

(21) Appl. No.: 16/229,189

(22) Filed: Dec. 21, 2018

(65) Prior Publication Data
US 2019/0198900 A1    Jun. 27, 2019

(30) Foreign Application Priority Data
Dec. 26, 2017 (JP) .............................. JP2017-248724

(51) Int. Cl.
| | |
|---|---|
| H01M 8/04746 | (2016.01) |
| B60L 50/72 | (2019.01) |
| B60L 58/33 | (2019.01) |
| H01M 8/04111 | (2016.01) |
| H01M 8/0432 | (2016.01) |
| H01M 8/0438 | (2016.01) |

(52) U.S. Cl.
CPC ......... *H01M 8/04761* (2013.01); *B60L 50/72* (2019.02); *B60L 58/33* (2019.02); *H01M 8/0435* (2013.01); *H01M 8/0441* (2013.01); *H01M 8/04111* (2013.01); *H01M 8/04343* (2013.01); *H01M 8/04402* (2013.01); *H01M 8/04776* (2013.01); *B60L 2240/12* (2013.01); *B60L 2240/545* (2013.01); *H01M 2250/20* (2013.01)

(58) Field of Classification Search
None
See application file for complete search history.

(56) References Cited

FOREIGN PATENT DOCUMENTS

| | | |
|---|---|---|
| JP | 07-288134 A | 10/1995 |
| JP | 2005-222892 A | 8/2005 |
| JP | 2006-100101 A | 4/2006 |
| JP | 2008-269983 | 11/2008 |
| JP | 2009-037869 A | 2/2009 |
| JP | 2009-037870 A | 2/2009 |
| JP | 2009037870 A * | 2/2009 |
| JP | 2009-283243 | 12/2009 |
| WO | WO 2009/016492 A2 | 2/2009 |

* cited by examiner

*Primary Examiner* — Ula C Ruddock
*Assistant Examiner* — Amanda Rosenbaum
(74) *Attorney, Agent, or Firm* — Finnegan, Henderson, Farabow, Garrett & Dunner, LLP

(57) ABSTRACT

A fuel cell system mounted in a mobile object is equipped with a bypass flow passage that establishes communication between an air compressor and an exhaust gas flow passage, and a valve that adjusts an amount of air supplied to the bypass flow passage. A control unit performs a process for increasing a flow rate of air caused to flow through the bypass flow passage, by controlling a drive amount of the air compressor and the opening degree of the valve, when an outside air temperature is equal to or lower than a threshold and a speed of the mobile object is equal to or lower than a determination speed. In the process, a flow rate of air at a first temperature that is lower than a second temperature that is equal to or lower than the threshold is larger than a flow rate of air at the second temperature.

10 Claims, 8 Drawing Sheets

FUEL CELL SYSTEM, MOBILE OBJECT, AND EXHAUST GAS DISCHARGE CONTROL METHOD

INCORPORATION BY REFERENCE

The disclosure of Japanese Patent Application No. 2017-248724 filed on Dec. 26, 2017 including the specification, drawings and abstract is incorporated herein by reference in its entirety.

BACKGROUND

1. Technical Field

The disclosure relates to a fuel cell system, a mobile object mounted with the fuel cell system, and an exhaust gas discharge control method.

2. Description of Related Art

A fuel cell system generates electric power by causing fuel gas (hydrogen) and the oxygen in air to react with each other, so water is produced. This water is discharged from an exhaust pipe to the atmosphere (outside air) as water in the form of liquid or water vapor in the form of gas. When the outside air temperature is low, this water vapor condenses by being cooled by the atmosphere, and becomes fine aggregates to form mist. It is described in Japanese Patent Application Publication No. 2008-269983 (JP 2008-269983 A) that the formation of mist is suppressed by discharging exhaust gas after reducing the amount of water vapor therein by adsorbing the water vapor through the use of a desiccant (silica).

SUMMARY

However, the method of Japanese Patent Application Publication No. 2008-269983 (JP 2008-269983 A) additionally requires the desiccant, and in some cases, replacement thereof as well. Besides, the aggregation with the aid of traveling wind does not sufficiently function while a vehicle is stopped. Accordingly, there have been demands to make the mist formed from exhaust gas inconspicuous when the vehicle is stopped or when the vehicle runs at low speed.

(1) A first aspect of the disclosure relates to a fuel cell system that is equipped with an air compressor, a fuel cell that is supplied with air from the air compressor, an exhaust gas flow passage that discharges exhaust gas from the fuel cell, a bypass flow passage that establishes communication between the air compressor and the exhaust gas flow passage, a bypass flow passage adjusting valve that adjusts an amount of air supplied to the bypass flow passage, an outside air temperature sensor that acquires an outside air temperature, a speed sensor that acquires a speed of the mobile object, and a control unit that is configured to perform control of the fuel cell system including operation of the fuel cell. The control unit is configured to perform a mist formation suppression process for increasing a flow rate of air caused to flow through the bypass flow passage, by controlling a drive amount of the air compressor and an opening degree of the bypass flow passage adjusting valve, when the outside air temperature is equal to or lower than an outside air temperature determination threshold and a speed of the mobile object is equal to or lower than a determination speed. In the mist formation suppression process, a first flow rate of air flowing through the bypass flow passage with the outside air temperature at a first temperature that is lower than a second temperature that is equal to or lower than the outside air temperature determination threshold is larger than a second flow rate of air flowing through the bypass flow passage with the outside air temperature at the second temperature.

According to this aspect, when the outside air temperature is equal to or lower than the outside air temperature determination threshold and the speed acquired by the speed sensor is equal to or lower than the determination speed, the air whose temperature has become high due to the air compressor is caused to flow through the exhaust gas flow passage via the bypass flow passage. Thus, the exhaust gas discharged from the fuel cell is discharged, with the relative humidity thereof lowered, to the atmosphere. Therefore, even when exhaust gas comes into contact with the atmosphere and the temperature of exhaust gas falls, it is possible to restrain the temperature of exhaust gas from falling to a dew-point temperature. As a result, the mist formed from exhaust gas can be made inconspicuous. Besides, the likelihood of the formation of mist increases as the outside air temperature falls. Therefore, when the first flow rate at the first temperature that is lower than the second temperature is larger than the second flow rate at the second temperature that is equal to or lower than the outside air determination threshold, the formation of mist from exhaust gas can be made unlikely. Even if mist is formed, this mist can be made inconspicuous.

(2) The fuel cell system may be further equipped with a temperature acquisition unit that is configured to acquire a temperature of exhaust gas discharged from the fuel cell. The control unit may be configured to perform the mist formation suppression process when the outside air temperature is equal to or lower than the outside air temperature determination threshold, the speed of the mobile object is equal to or lower than the determination speed, and the temperature of the exhaust gas is equal to or higher than an exhaust gas temperature determination threshold. In the case where exhaust gas is assumed to contain a saturated water vapor amount of water vapor, the absolute humidity rises and the likelihood of the formation of mist at the time of contact with the atmosphere increases as the temperature rises. According to this aspect, the mist formation suppression process is performed when the temperature of exhaust gas at which mist is more likely to be formed is equal to or higher than a determination temperature. Therefore, the formation of mist from exhaust gas can be made unlikely. Even when mist is formed, this mist can be made inconspicuous.

(3) The fuel cell system may be further equipped with a temperature sensor that measures a temperature of a cooling medium discharged from the fuel cell. The temperature acquisition unit may be configured to acquire a temperature of the exhaust gas through the use of the temperature of the cooling medium discharged from the fuel cell. According to this aspect, a temperature sensor that measures the temperature of exhaust gas is not required.

(4) The control unit may be configured to acquire a mist formation temperature as a lowest temperature at which mist is formed when exhaust gas containing a saturated water vapor amount of water vapor is discharged, through the use of the outside air temperature, acquire a target flow rate of air flowing through the bypass flow passage, through the use of a ratio between the saturated water vapor amount at the mist formation temperature and the saturated water vapor amount at the temperature of the exhaust gas, and perform the mist formation suppression process. According to this aspect, the control for making the mist formed from exhaust gas inconspicuous can be accurately performed.

(5) A second aspect of the disclosure relates to a mobile object mounted with the aforementioned fuel cell system.

(6) A third aspect of the disclosure relates to an exhaust gas discharge control method for exhaust gas discharged from a mobile object mounted with a fuel cell system. The exhaust gas discharge control method includes acquiring an outside air temperature, acquiring a speed of the mobile object, supplying air to a fuel cell, performing a mist formation suppression process for controlling a flow rate of the air such that a first flow rate of the air flowing through a bypass flow passage at a first temperature that is lower than a second temperature that is equal to or lower than an outside air temperature determination threshold becomes larger than a second flow rate of the air flowing through the bypass flow passage at the second temperature, when the outside air temperature is equal to or lower than the outside air temperature determination threshold and the speed of the mobile object is equal to or lower than a determination speed, and mixing and discharging the air and the exhaust gas discharged from the fuel cell. The bypass flow passage establishes communication between an air compressor and an exhaust gas flow passage.

In the specification, the word "acquire" includes the meaning of the word "measure."

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
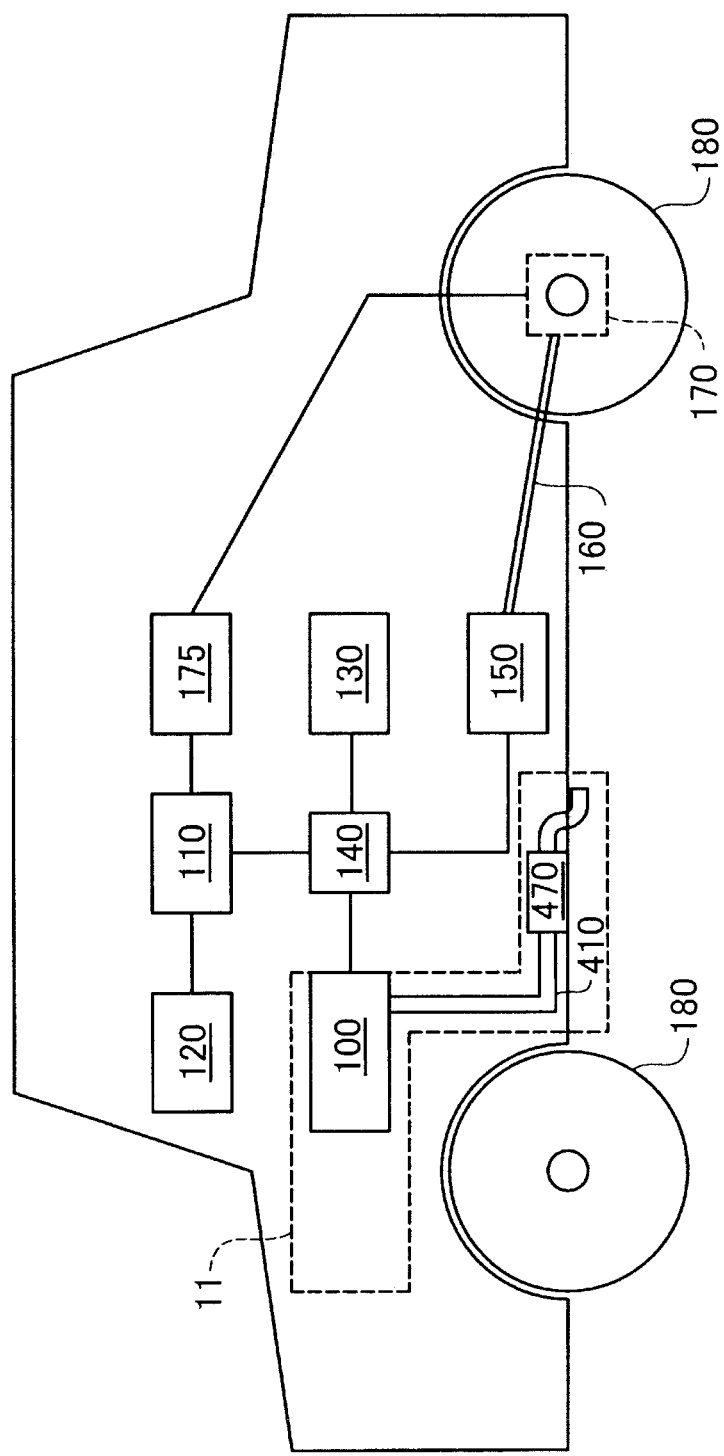
FIG. 1 is an illustrative view schematically showing the configuration of a fuel cell-mounted vehicle.

FIG. 1 is an illustrative view schematically showing the configuration of a fuel cell-mounted vehicle 10. The fuel cell-mounted vehicle 10 is equipped with a fuel cell system 11, a control unit 110, a start switch 120, a secondary battery 130, an electric power distribution controller 140, a drive motor 150, a drive shaft 160, a motive power distribution gear 170, a speed sensor 175, and wheels 180. The fuel cell system 11 is equipped with a fuel cell 100, an exhaust gas flow passage 410, and a silencer 470. The details of the fuel cell system 11 will be described later.

The fuel cell 100 is an electric power generation device for taking out electric power by causing fuel gas and oxidant gas to electrochemically react with each other. The control unit 110 controls the operations of the fuel cell 100 and the secondary battery 130. The start switch 120 is a main switch that makes a changeover between the activation and stop of the fuel cell-mounted vehicle 10. The secondary battery 130 is used as an electric power supply for moving the fuel cell-mounted vehicle 10 when the electric power generated by the fuel cell 100 is small, for example, immediately after the fuel cell-mounted vehicle 10 is activated. For example, a nickel hydride battery or a lithium-ion battery can be adopted as the secondary battery 130. The secondary battery 130 can be charged, for example, directly through the use of the electric power output from the fuel cell 100, or through regeneration of kinetic energy of the fuel cell-mounted vehicle 10 by the drive motor 150 at the time of deceleration of the fuel cell-mounted vehicle 10. Upon receiving a command from the control unit 110, the electric power distribution controller 140 controls the amount of electric power extracted from the fuel cell 100 to the drive motor 150 and the amount of electric power extracted from the secondary battery 130 to the drive motor 150. Besides, upon receiving a command from the control unit 110, the electric power distribution controller 140 sends the electric power regenerated by the drive motor 150 to the secondary battery 130, when the fuel cell-mounted vehicle 10 is decelerated. The drive motor 150 functions as an electric motor for moving the fuel cell-mounted vehicle 10. Besides, the drive motor 150 functions as an electric power generator that regenerates the kinetic energy of the fuel cell-mounted vehicle 10 into electric energy, when the fuel cell-mounted vehicle 10 is decelerated. The drive shaft 160 is a rotary shaft for transmitting a driving force generated by the drive motor 150 to the motive power distribution gear 170. The motive power distribution gear 170 distributes the driving force to the right and left wheels 180. The motive power distribution gear 170 is provided with the speed sensor 175. The speed sensor 175 may be provided on the drive shaft 160 or one of the wheels 180.

Figure 2:
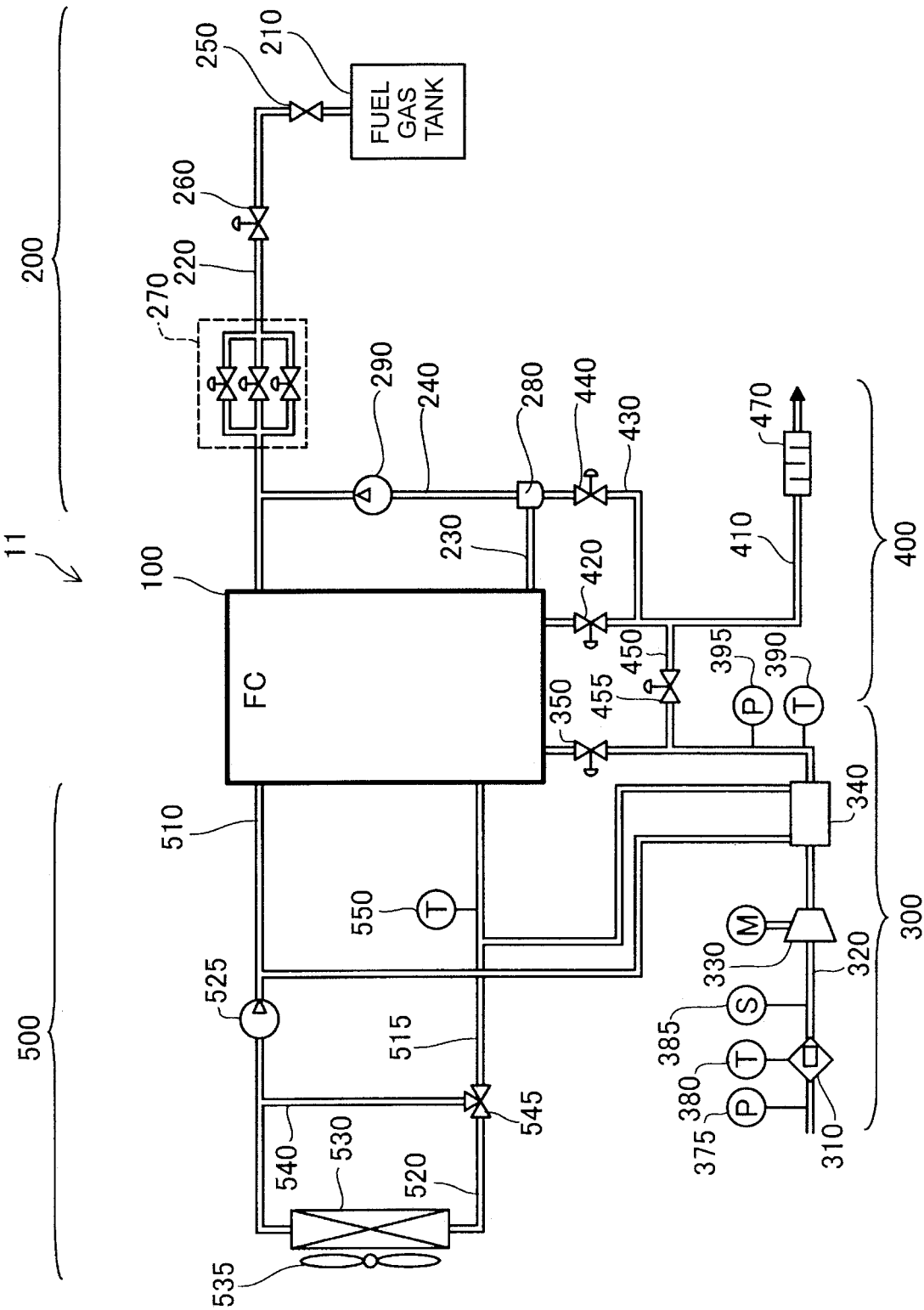
FIG. 2 is an illustrative view showing the overall configuration of a fuel cell system.

FIG. 2 is an illustrative view showing the overall configuration of the fuel cell system 11. The fuel cell system 11 is equipped with the fuel cell 100, a fuel gas supply circuit 200, an air supply circuit 300, an exhaust gas circuit 400, and a cooling circuit 500.

The fuel gas supply circuit 200 is equipped with a fuel gas tank 210, a fuel gas supply flow passage 220, a fuel gas exhaust flow passage 230, a fuel gas recirculation flow passage 240, a main valve 250, a regulator 260, three injectors 270, a gas-liquid separator 280, and a recirculation pump 290. The fuel gas tank 210 stores fuel gas. In the present embodiment, hydrogen is used as fuel gas.

The fuel gas tank 210 and the fuel cell 100 are connected to each other by the fuel gas supply flow passage 220. The fuel gas supply flow passage 220 is provided with the main valve 250, the regulator 260, and the injectors 270 in this sequence from the fuel gas tank 210 side. The main valve 250 turns on/off the supply of fuel gas from the fuel gas tank 210. The regulator 260 reduces the pressure of fuel gas to a predetermined pressure and supplies the fuel gas to the injectors 270. Each of the injectors 270 is an injector device that adjusts the pressure and amount of fuel gas and that injects the fuel gas into the fuel cell 100. In the present embodiment, the three injectors 270 are arranged in parallel with one another. Incidentally, the number of injectors 270 may not necessarily be three, and it is also appropriate to adopt a configuration in which a single injector or two or more injectors are provided. In the case where the plurality of the injectors 270 are provided as in the present embodiment, the amount of fuel gas injected into the fuel cell 100 can be easily adjusted in accordance with the amount of electric power generation required of the fuel cell 100.

The fuel gas exhaust flow passage 230 discharges fuel exhaust gas from the fuel cell 100. The fuel gas recirculation flow passage 240 is connected to the fuel gas exhaust flow passage 230 and the fuel gas supply flow passage 220. The gas-liquid separator 280 is provided between the fuel gas exhaust flow passage 230 and the fuel gas recirculation flow passage 240. Fuel exhaust gas contains the fuel gas unconsumed through a reaction, impurities such as the nitrogen that has moved through the fuel cell 100, and water. The gas-liquid separator 280 separates the water in fuel exhaust gas from the gas (fuel gas and impurities such as the nitrogen that has moved through the fuel cell 100). The fuel gas recirculation flow passage 240 is provided with the recirculation pump 290. The gas containing the unconsumed fuel gas, which has been separated by the gas-liquid separator 280, is returned to the fuel gas supply flow passage 220 by the recirculation pump 290, and is reutilized. Incidentally, the water separated by the gas-liquid separator 280 will be described later.

The air supply circuit 300 is equipped with an air cleaner 310, an air supply flow passage 320, an air compressor 330, an inter-cooler 340, a stuck inlet valve 350, an atmospheric pressure sensor 375, an outside air temperature sensor 380, an airflow meter 385, a supply gas temperature sensor 390, and a supply gas pressure sensor 395. The fuel cell 100 of the present embodiment uses air as oxidant gas. Incidentally, the oxygen in air functions as an oxidant.

In taking air in, the air cleaner 310 removes dust from the air. The air cleaner 310 and the fuel cell 100 are connected to each other by the air supply flow passage 320. The air supply flow passage 320 is provided with the air compressor 330, the inter-cooler 340, and the stuck inlet valve 350 in this sequence from the air cleaner 310 side. The air compressor 330 compresses air, and sends the air to the fuel cell 100 through the air supply flow passage 320. In general, when gas is compressed, the temperature thereof rises. This is because gas is compressed against the pressure thereof and hence a work is applied thereto. The inter-cooler 340 exchanges heat such that the temperature of air that has been heated up by being compressed by the air compressor 330 becomes approximately equal to the temperature of the fuel cell 100. That is, a cooling medium discharged from the fuel cell 100 is divided and supplied to the inter-cooler 340. The temperature of this cooling medium is approximately equal to the temperature of the fuel cell 100. Accordingly, the temperature of the compressed air is approximately equal to the temperature of the fuel cell 100. Incidentally, the temperature of exhaust gas discharged from the fuel cell 100 is also approximately equal to the temperature of the fuel cell 100. The stuck inlet valve 350 is a valve for turning on/off the supply of air to the fuel cell 100. The atmospheric pressure sensor 375 measures an atmospheric pressure. The outside air temperature sensor 380 acquires a temperature of air that has not been taken in yet. The airflow meter 385 measures a flow rate of air that has been taken in. The supply gas temperature sensor 390 measures a temperature of air supplied to the fuel cell 100. The supply gas pressure sensor 395 measures a pressure of air supplied to the fuel cell 100.

The exhaust gas circuit 400 is equipped with the exhaust gas flow passage 410, a pressure adjusting valve 420, a fuel gas discharge flow passage 430, an exhaust gas drainage valve 440, an oxidant gas bypass flow passage 450 (hereinafter abbreviated as "the bypass flow passage 450"), and the silencer 470. The exhaust gas flow passage 410 discharges oxidant exhaust gas of the fuel cell 100. The exhaust gas flow passage 410 is provided with the pressure adjusting valve 420. The pressure adjusting valve 420 adjusts the pressure of air in the fuel cell 100. The fuel gas discharge flow passage 430 connects the gas-liquid separator 280 and the exhaust gas flow passage 410 to each other. The fuel gas discharge flow passage 430 is provided with the exhaust gas drainage valve 440. The bypass flow passage 450 establishes communication between the air supply flow passage 320 and the exhaust gas flow passage 410. The bypass flow passage 450 is provided with a bypass flow passage adjusting valve 455. The bypass flow passage 450 is a flow passage for causing air to flow to the exhaust gas flow passage 410 in a bypassing manner without passing through the fuel cell 100. The bypass flow passage adjusting valve 455 adjusts the flow rate of bypass air as the air caused to flow to the bypass flow passage 450, through the adjustment of the opening degree of the bypass flow passage adjusting valve 455 and the opening degree thereof. The adjustment of the opening degree of the bypass flow passage adjusting valve 455 includes the adjustment of opening/closing of the bypass flow passage adjusting valve 455.

The control unit 110 (FIG. 1) opens the exhaust gas drainage valve 440 to discharge water and gas from the fuel gas discharge flow passage 430, when the concentration of nitrogen in fuel exhaust gas becomes high or when the amount of water in the gas-liquid separator 280 becomes large. The discharged gas contains fuel gas and impurities such as nitrogen and the like. In the present embodiment, the fuel gas discharge flow passage 430 is connected to the exhaust gas flow passage 410, and the fuel gas in the discharged gases is diluted by oxidant exhaust gas. Incidentally, the control unit 110 may supply air from the bypass flow passage 450 and further dilute the fuel gas in the discharged gases by opening the bypass flow passage adjusting valve 455. The silencer 470 is provided at a downstream portion of the exhaust gas flow passage 410 to reduce exhaust noise.

The cooling circuit 500 is equipped with a cooling medium supply flow passage 510, a cooling medium discharge flow passage 515, a radiator flow passage 520, a water pump 525, a radiator 530, a cooling medium bypass flow passage 540, and a three-way valve 545. The cooling medium supply flow passage 510 is a flow passage for supplying the cooling medium to the fuel cell 100, and the water pump 525 is arranged in the cooling medium supply flow passage 510. The cooling medium discharge flow passage 515 is a flow passage for discharging the cooling medium from the fuel cell 100. The cooling medium discharge flow passage 515 is provided with a temperature sensor 550, which measures a temperature of the cooling medium discharged from the fuel cell 100. The temperature measured by the temperature sensor 550 is approximately equal to the temperature inside the fuel cell 100, and is also approximately equal to the temperature of exhaust gas discharged from the fuel cell 100. A downstream portion of the cooling medium discharge flow passage 515 is connected to the radiator flow passage 520 and the cooling medium bypass flow passage 540 via the three-way valve 545. The radiator flow passage 520 is provided with the radiator 530. The radiator 530 is provided with a radiator fan 535. The radiator fan 535 sends wind to the radiator 530 to accelerate the dissipation of heat from the radiator 530. A downstream portion of the radiator flow passage 520 and a downstream portion of the cooling medium bypass flow passage 540 are connected to the cooling medium supply flow passage 510. The cooling medium supply flow passage 510 and the cooling medium discharge flow passage 515 are connected to the inter-cooler 340.

Figure 3:
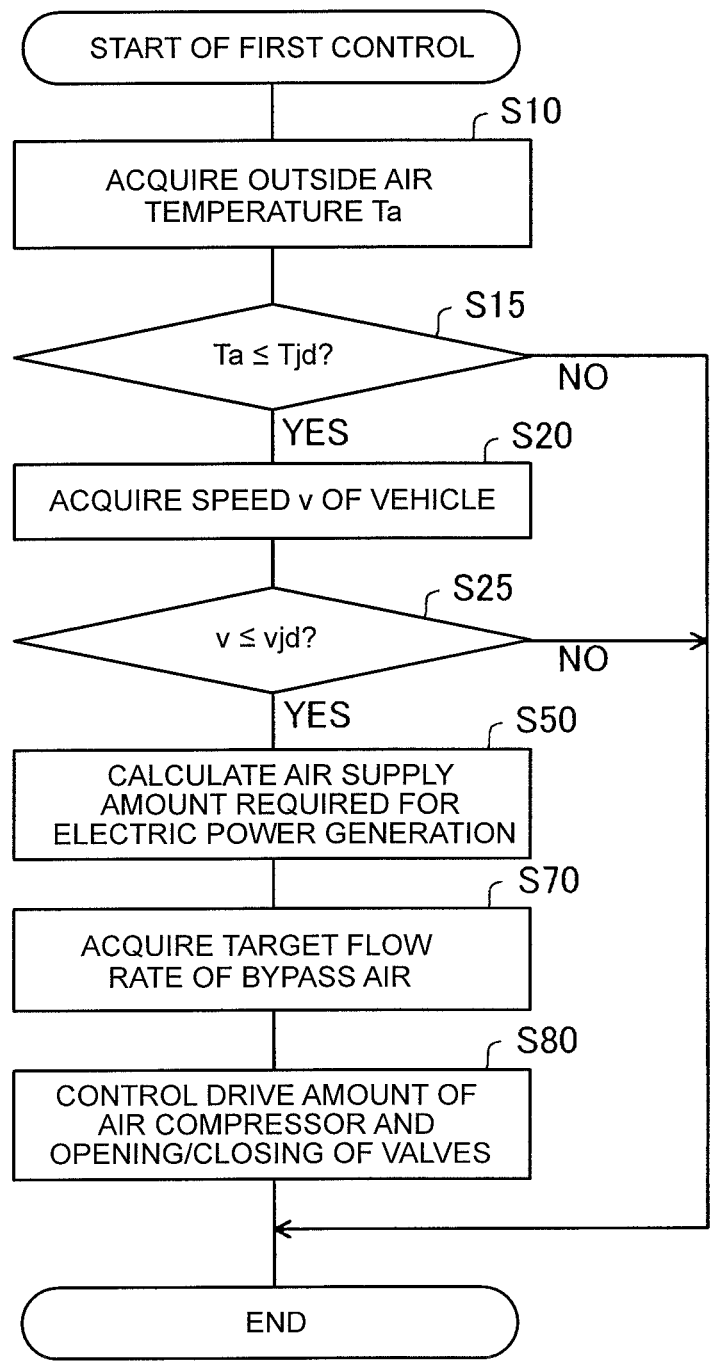
FIG. 3 is a flowchart of control that is performed by a control unit to suppress the formation of mist.

FIG. 3 is a flowchart of control that is performed by the control unit 110 to suppress the formation of mist. A process shown in FIG. 3 is repeatedly performed during the driving of the fuel cell-mounted vehicle 10. In step S10, the control unit 110 acquires an outside air temperature Ta from the outside air temperature sensor 380. In step S15, the control unit 110 determines whether or not the outside air temperature Ta is equal to or lower than an outside air temperature determination threshold Tjd. The outside air temperature determination threshold Tjd assumes a value selected from between, for example, −5° C. and +10° C. For example, the outside air temperature determination threshold Tjd is 5° C. If the outside air temperature Ta is not equal to or lower than the outside air temperature determination threshold Tjd (NO in step S15), namely, if the outside air temperature Ta is higher than the outside air temperature determination threshold Tjd, this process is ended. This is because of the following reason. In this case, the outside air temperature Ta is high, so the amount of saturated water vapor in the atmosphere is large, and the amount of saturated water vapor also greatly changes as the temperature changes. Therefore, even in the case where exhaust gas containing a saturated water vapor amount of water vapor is discharged from the fuel cell-mounted vehicle 10, when the absolute humidity of the atmosphere is not high, the amount of saturated water vapor in the atmosphere is large. Therefore, the amount of water vapor in the gas mixed with the atmosphere is unlikely to become larger than the saturated water vapor amount, so mist is unlikely to be formed. Besides, the saturated water vapor amount also greatly changes as the temperature changes. Therefore, even in the case where the absolute humidity of the atmosphere is high, when the temperature of the atmosphere slightly rises due to exhaust gas, the amount of saturated water vapor in the atmosphere becomes large. As a result, mist is unlikely to be formed. Even when mist is formed, this mist is inconspicuous. Accordingly, there is no need to perform the control for suppressing the formation of mist or making mist inconspicuous. On the other hand, if the outside air temperature Ta is equal to or lower than the outside air temperature determination threshold Tjd (YES in step S15), a transition to step S20 is made.

In step S20, the control unit 110 acquires a speed (a vehicle speed) v of the fuel cell-mounted vehicle 10 from the speed sensor 175. In step S25, the control unit 110 determines whether or not the speed v is equal to or lower than a determination speed vjd. The determination speed vjd assumes a value selected from between, for example, 0 km/h and 10 km/h. For example, the determination speed vjd is 0 km/h. If the speed v is higher than the determination speed vjd (NO in step S25), this process is ended. This is because of the following reason. In this case, the fuel cell-mounted vehicle 10 diffuses water vapor while running, so mist is unlikely to be formed. Even when mist is formed, this mist is inconspicuous. Therefore, there is no need to perform the control for suppressing the formation of mist or making mist inconspicuous. On the other hand, if the speed v is equal to or lower than the determination speed vjd (YES in step S25), a transition to step S50 is made.

In step S50, the control unit 110 calculates an amount of electric power generated by the fuel cell 100 from an amount of electric power consumed by the fuel cell-mounted vehicle 10, and calculates a flow rate of air required for electric power generation of the fuel cell 100. In step S70, the control unit 110 acquires, based on the outside air temperature Ta, a target flow rate of bypass air for preventing the formation of mist even when exhaust gas comes into contact with the atmosphere. For example, the control unit 110 has, as a map, a relationship between the outside air temperature Ta and the required flow rate of bypass air, and acquires a corresponding target flow rate of bypass air from the outside air temperature Ta.

Figure 4:
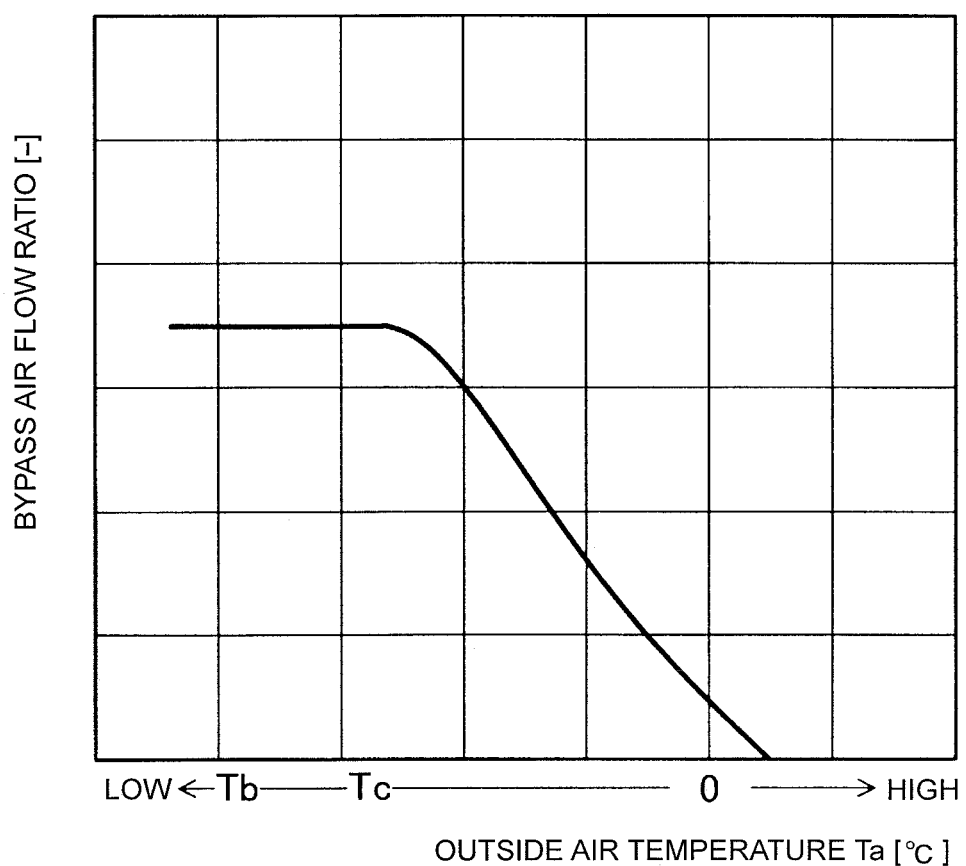
FIG. 4 is an exemplary map showing a relationship between an outside air temperature Ta and a flow ratio of bypass air.

FIG. 4 is an exemplary map showing a relationship between the outside air temperature Ta and the flow ratio of bypass air. The axis of abscissa of FIG. 4 represents the outside air temperature Ta, and the axis of ordinate represents the flow ratio of bypass air. The flow ratio of bypass air is a ratio (hereinafter referred to as "a scaling factor") of the flow rate of bypass air to the flow rate of air required for electric power generation of the fuel cell 100. With this scaling factor, the flow rate at a first temperature that is lower than a second temperature that is equal to or lower than the outside air temperature determination threshold Tjd is larger than the flow rate at the second temperature. That is, when the outside air temperature Ta becomes low, the flow rate of bypass air becomes large. However, when the outside air temperature Ta becomes too low, for example, equal to or lower than an outside air temperature Tb, the amount of saturated water vapor in the atmosphere hardly changes from an amount at an outside air temperature Tc (Tc>Tb). Accordingly, in the case where the outside air temperature is equal to or lower than Tc, the flow rate of bypass air hardly changes from the flow rate of bypass air at the time when the outside air temperature is equal to Tc, even if the outside air temperature becomes lower. Therefore, the control can be simplified when the outside air temperature is equal to or lower than Tc. Besides, there is no need to make the drive amount of the air compressor 330 large when the outside air temperature is equal to Tb. Therefore, the energy required for the mist formation suppression process can be reduced. Incidentally, the flow ratio of bypass air may originally be increased as the temperature falls.

In step S80 of FIG. 3, the control unit 110 controls the drive amount of the air compressor 330 and the opening degrees of the stuck inlet valve 350 and the bypass flow passage adjusting valve 455, from the flow rate of air caused to flow through the fuel cell 100 and the flow rate of bypass air. For example, in the case where exhaust gas is diluted k (k is a numeral larger than 1) times with respect to the flow rate of air required for electric power generation of the fuel cell 100, the control unit 110 regards the drive amount of the air compressor 330 as a drive amount for increasing the flow rate of air required for electric power generation of the fuel cell 100 $k$ times, adjusts the opening degrees of the stuck inlet valve 350 and the bypass flow passage adjusting valve 455, and performs control in such a manner as to cause the amount of air multiplied by (k−1) to flow through the bypass flow passage 450.

In the case where the outside air temperature determination threshold Tjd is 0° C., even when the air whose temperature is equal to or lower than the outside air temperature determination threshold Tjd contains the saturated water vapor amount of water vapor, the amount of water vapor is small. When the air compressor 330 compresses air, the temperature of air rises. The inter-cooler 340 exchanges heat with the compressed air, and the temperature thereof becomes approximately equal to the temperature of the cooling medium discharged from the fuel cell 100. On the other hand, the temperature of exhaust gas discharged from the fuel cell 100 is approximately equal to the temperature of the cooling medium discharged from the fuel cell 100. It is assumed herein that the relative humidity of exhaust gas is approximately 100%. In this case, when the same amount of bypass air is mixed with exhaust gas, the relative humidity of the mixture gas falls to approximately 50%. When twice the amount of bypass air is mixed with exhaust gas, the relative humidity of the mixture gas falls to approximately 33%. Since exhaust gas is mixed with bypass air, only the relative humidity of the mixture gas is lowered while the temperature thereof is maintained. This mixture gas whose relative humidity has been lowered is discharged to the atmosphere at the outside air temperature Ta, as exhaust gas. The mixture gas comes into contact with the atmosphere, the temperature thereof is lowered by the atmosphere, and the saturated water vapor amount at the temperature is reduced. However, even when the saturated water vapor amount is reduced, the relative humidity of exhaust gas is unlikely to become higher than 100%. As a result, it is possible to suppress the formation of mist or make mist inconspicuous.

As described above, according to the first embodiment, while the temperature of exhaust gas is held high, the relative humidity of exhaust gas is lowered by bypass gas, and this exhaust gas is discharged to the atmosphere afterward. Since the temperature of exhaust gas is lowered by the atmosphere, the relative humidity of exhaust gas rises, but the relative humidity of exhaust gas has been lowered by bypass gas. Therefore, even when the temperature of exhaust gas is lowered by the atmosphere, the relative humidity of exhaust gas is unlikely to become higher than 100%. As a result, the formation of mist can be suppressed, or mist can be made inconspicuous even in the case of the formation thereof. Besides, when exhaust gas whose relative humidity has been lowered is discharged and mixed with the atmosphere, the temperature of the atmosphere becomes high in a certain region where the atmosphere is mixed with exhaust gas, and the amount of saturated water vapor in the atmosphere also increases in this region. This effect also makes the relative humidity unlikely to become higher than 100%, and can suppress the formation of mist or make mist inconspicuous.

Besides, in the first embodiment, the control unit 110 controls the flow rate of bypass air such that the flow rate of bypass air at the first temperature that is lower than the second temperature becomes larger than the flow rate of bypass air at the second temperature that is equal to or lower than the outside air temperature determination threshold Tjd. Therefore, the flow rate of bypass air is increased, and the relative humidity of exhaust gas discharged to the atmosphere is lowered as the outside air temperature Ta at which mist is likely to be formed falls. Besides, exhaust gas is more extensively diffused and thinned due to a large flow rate thereof, so the mist can be made more inconspicuous.

If the flow rate of bypass air is made (k−1) times as large as the flow rate of air required for electric power generation of the fuel cell 100, a wasteful increase in the flow rate of bypass air is not caused. Therefore, energy saving can be realized by holding the drive amount of the air compressor 330 small while making the formation of mist inconspicuous. Incidentally, the flow rate of bypass air may be made larger than the product of (k−1) and the flow rate of air required for electric power generation of the fuel cell 100. Thus, the formation of mist can be made more inconspicuous.

In the first embodiment, the formation of mist can be suppressed simply by using the components with which the normal fuel cell system 11 is often equipped, namely, the air compressor 330, the bypass flow passage 450, and the bypass flow passage adjusting valve 455. Therefore, there is no need to provide an additional configuration in which moisture is removed by cooling and condensing exhaust gas before the discharge thereof.

The control unit 110 has been described as having, as the map, the relationship between the outside air temperature Ta and the required flow rate of bypass air. However, the control unit 110 may have a plurality of maps that represent the relationship between the outside air temperature Ta and the required flow rate of bypass air and that correspond to the speed. As the speed rises, water vapor is diffused by traveling wind, so the required flow rate of bypass air is small.

In the aforementioned first embodiment, 5° C. is selected as the outside air temperature determination threshold Tjd in step S15. However, for example, in the case where the cathode gas supplied to the fuel cell 100 is humidified through the use of the moisture in cathode exhaust gas, the amount of moisture in the cathode exhaust gas discharged to the outside of the vehicle is small, so mist is not formed unless the outside air temperature becomes lower. Accordingly, in the case where the cathode gas supplied to the fuel cell 100 is humidified through the use of the moisture in cathode exhaust gas, a temperature lower than 5° C., for example, a temperature between −10° C. and −30 C° may be adopted as the outside air temperature determination threshold Tjd.

It has been described in the aforementioned first embodiment that the process is ended when the outside air temperature Ta is higher than the outside air temperature determination threshold Tjd or when the speed v is higher than the determination speed vjd, but this means nothing but refraining from performing the process for suppressing the formation of mist. Even when Ta>Tjd, air may be caused to flow through the bypass flow passage 450. For example, when anode exhaust gas is discharged, air may be caused to flow through the bypass flow passage 450 with a view to diluting hydrogen.

Second Embodiment

In the first embodiment, the control unit 110 controls the flow rate of bypass air such that the flow rate of bypass air caused to flow through the bypass flow passage when the outside air temperature Ta is low becomes larger or approximately equal to the flow rate of bypass air caused to flow through the bypass flow passage when the outside air temperature Ta is high, namely, such that the flow rate of bypass air at the second temperature with the outside air temperature Ta being low becomes equal to or larger than the flow rate of bypass air at the first temperature with the outside air temperature Ta being higher than the second temperature. In the second embodiment, the control unit 110 acquires a temperature of exhaust gas from a temperature of the cooling medium discharged from the fuel cell 100, and acquires a flow rate of bypass air caused to flow through the bypass flow passage 450, through the use of the temperature of exhaust gas and the outside air temperature.

Figure 5:
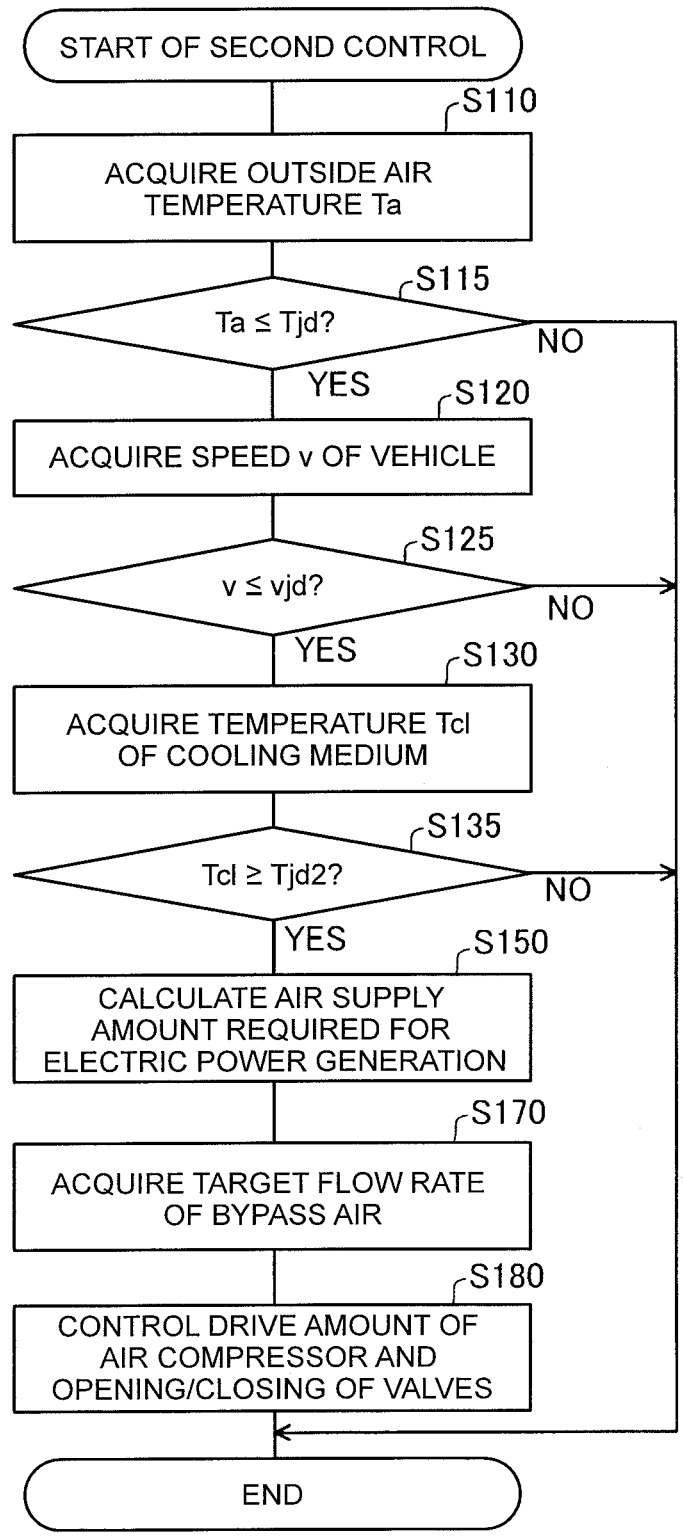
FIG. 5 is a flowchart of control that is performed by a control unit to suppress the formation of mist in the second embodiment.

FIG. 5 is a flowchart of control that is performed by the control unit 110 to suppress the formation of mist in the second embodiment. As is the case with the process shown in FIG. 3, a process shown in FIG. 5 is repeatedly performed during the driving of the fuel cell-mounted vehicle 10. Steps S110, S115, S120, and S125 correspond to steps S10, S15, S20, and S25 of FIG. 3 respectively. If the speed v is equal to or lower than the determination speed vjd in step S125, a transition to step S130 is made. If the speed v is higher than the determination speed vjd in step S125, the process is ended.

In step S130, the control unit 110 acquires the temperature Tcl of the cooling medium discharged from the fuel cell 100 through the use of the temperature sensor 550. The temperature of this cooling medium is approximately equal to the temperature of exhaust gas discharged from the fuel cell 100. Besides, the inter-cooler 340 exchanges heat with bypass air, and the temperature thereof becomes equal to the temperature of the cooling medium. Incidentally, the temperature of the fuel cell 100 or the temperature of exhaust gas may be acquired instead of the temperature of the cooling medium.

In step S135, the control unit 110 determines whether or not the temperature Tcl of the cooling medium is equal to or higher than an exhaust gas temperature determination threshold Tjd2. As described above, the temperature Tcl of the cooling medium is approximately equal to the temperature of exhaust gas discharged from the fuel cell 100, so the determination can be made according to the temperature Tcl of the cooling medium instead of the temperature of exhaust gas. Therefore, the appellation of the exhaust gas temperature determination threshold Tjd2 is used as a determination criterion on the temperature Tcl of the cooling medium for the sake of convenience. Incidentally, if the temperature Tcl of the cooling medium is lower than the exhaust gas temperature determination threshold Tjd2, the amount of saturated water vapor in exhaust gas is small, and the absolute humidity thereof is low. Therefore, even when exhaust gas is discharged to the atmosphere, mist is unlikely to be formed. Therefore, the process is ended without performing the control of increasing the flow rate of bypass air. On the other hand, if the temperature Tcl of the cooling medium is equal to or higher than the exhaust gas temperature determination threshold Tjd2, the control unit 110 makes a transition to step S150 to calculate a supply amount of air required for electric power generation. Step S150 is the same as step S50 of FIG. 3.

In step S170, the control unit 110 acquires a target flow rate of bypass air for preventing the formation of mist from exhaust gas, from the outside air temperature Ta and the temperature Tcl of the cooling medium. For example, the control unit 110 has, as a map, a relationship among the outside air temperature Ta, the temperature Tcl of the cooling medium, and the required flow rate of bypass air, and acquires a corresponding target flow rate of bypass air from the outside air temperature Ta.

Figure 6:
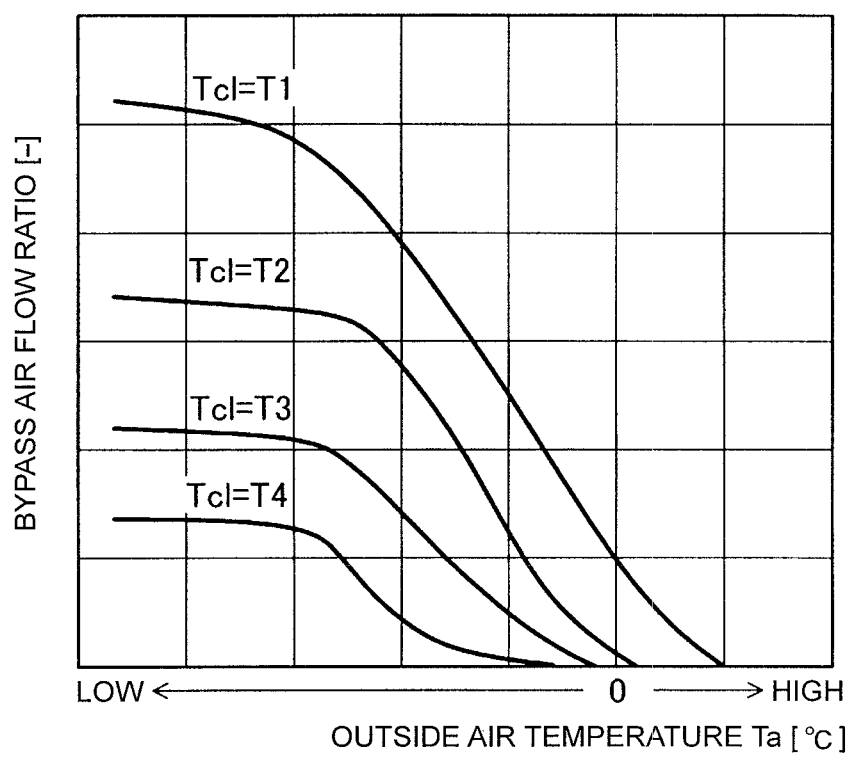
FIG. 6 is an exemplary map showing a relationship among the outside air temperature Ta, a temperature Tcl of a cooling medium, and the flow ratio of bypass air.

FIG. 6 is an exemplary map showing a relationship among the outside air temperature Ta, the temperature Tcl of the cooling medium, and the flow ratio of bypass air. The axis of abscissa of FIG. 6 represents the outside air temperature Ta, and the axis of ordinate of FIG. 6 represents the flow ratio of bypass air. FIG. 6 shows a relationship between the outside air temperature Ta and the flow ratio of bypass air at four temperatures T1 to T4 (T1>T2>T3>T4) of the cooling medium. In the same manner as shown in FIG. 4, the flow ratio of bypass air at the time when the outside air temperature is low is equal to or larger than the flow ratio of bypass air at the time when the outside air temperature is high. Besides, the flow ratio of bypass air increases as the temperature Tcl of the cooling medium rises. As the temperature Tcl of the cooling medium rises, the temperature of exhaust gas rises, and the amount of water vapor contained in exhaust gas increases, that is, the absolute humidity rises. Therefore, as the temperature Tcl of the cooling medium rises, the unlikelihood of the formation of mist can be increased by further diluting exhaust gas with bypass air to lower the relative humidity.

In step S180 of FIG. 5 as well as step S80 of FIG. 3, the control unit 110 controls the drive amount of the air compressor 330 and the opening degrees of the stuck inlet valve 350 and the bypass flow passage adjusting valve 455, from the flow rate of air caused to flow through the fuel cell 100 and the flow rate of bypass air.

As described above, in the second embodiment as well, the relative humidity of exhaust gas is lowered while the temperature thereof is held high by bypass gas, and exhaust gas is discharged to the atmosphere afterward. Since the temperature of exhaust gas is lowered by the atmosphere, the relative humidity of exhaust gas rises, but the relative humidity of exhaust gas has been lowered while the temperature thereof is held high by bypass gas. Therefore, even when the temperature of exhaust gas is lowered, the relative humidity of exhaust gas is unlikely to become higher than 100%. As a result, the formation of mist can be suppressed.

In the second embodiment, when the temperature Tcl, namely, the temperature of exhaust gas is low, the amount of air caused to flow through the bypass flow passage 450 is made equal to zero (Tcl<Tjd2 in step S135), or the flow rate of bypass air is made small as shown in FIG. 6. Accordingly, the drive amount of the air compressor 330 can be reduced in accordance with the temperature of exhaust gas. Therefore, energy saving can be realized when the temperature Tcl of the cooling medium is low.

In the second embodiment, the temperature sensor 550 that acquires the temperature of the cooling medium discharged from the fuel cell 100 is used as the temperature acquisition unit that acquires the temperature of exhaust gas. The temperature of exhaust gas is approximately equal to the temperature of the cooling medium discharged from the fuel cell 100. Therefore, the use of the temperature sensor 550 eliminates the need to provide a temperature sensor that measures the temperature of exhaust gas.

When the map showing the relationship among the outside air temperature Ta, the temperature Tcl of the cooling medium, and the flow ratio of bypass air is used as in the second embodiment, a calculation process can be simplified. Therefore, the process can be performed at high speed.

In the second embodiment, when the temperature Tcl of the cooling medium is equal to, for example, a temperature Tx between T1 and T2, the flow rate of bypass air may be obtained through an interpolation process using the flow rate of bypass air at the temperature T1 and the flow rate of bypass air at the temperature T2.

Incidentally, the first embodiment and the second embodiment have the following relationship. The first embodiment can be regarded as a modification of the second embodiment in which the temperature Tcl of the cooling medium is regarded as constant and the formation of mist is suppressed or mist is made inconspicuous without carrying out steps S130 and S135. For example, when a certain time elapses after activation of the fuel cell-mounted vehicle 10, the temperature of the fuel cell 100 becomes substantially constant, and the temperature Tcl of the cooling medium and the temperature of exhaust gas also become approximately equal to the temperature of the fuel cell 100. Therefore, only the outside air temperature Ta and the speed v of the fuel cell-mounted vehicle 10 may be taken into account to determine the flow rate of bypass air. That is, the control unit 110 may change over the control to the flowchart of the control according to the first embodiment as soon as the temperature Tcl of the cooling medium becomes higher than a changeover temperature after starting to carry out the flowchart of the control according to the second embodiment. After the control is changed over to the flowchart of the control according to the first embodiment, only the outside air temperature Ta and the speed v of the fuel cell-mounted vehicle 10 may be taken into account to determine the flow rate of bypass air. Therefore, the control can be simplified. Incidentally, the control unit 110 may change over the control to the flowchart of the control according to the first embodiment as soon as a certain time elapses after starting to carry out the flowchart of the control according to the second embodiment.

Third Embodiment

In the third embodiment, the control unit 110 acquires a temperature of exhaust gas from the temperature of the cooling medium discharged from the fuel cell 100, acquire a mist formation temperature corresponding to the temperature of exhaust gas, and acquire a flow rate of bypass air caused to flow through the bypass flow passage 450 through the use of a ratio between the amount of saturated water vapor at the mist formation temperature and the amount of saturated water vapor at the temperature of exhaust gas. Therefore, the suppression of the formation of mist is more accurately controlled. The temperature of exhaust gas may be directly acquired by a temperature sensor that is provided in the exhaust gas flow passage 410. Besides, making use of the fact that the temperature of exhaust gas is approximately equal to the temperature of the cooling medium, the control unit 110 may regard and use the temperature of the cooling medium as the temperature of exhaust gas.

Figure 7:
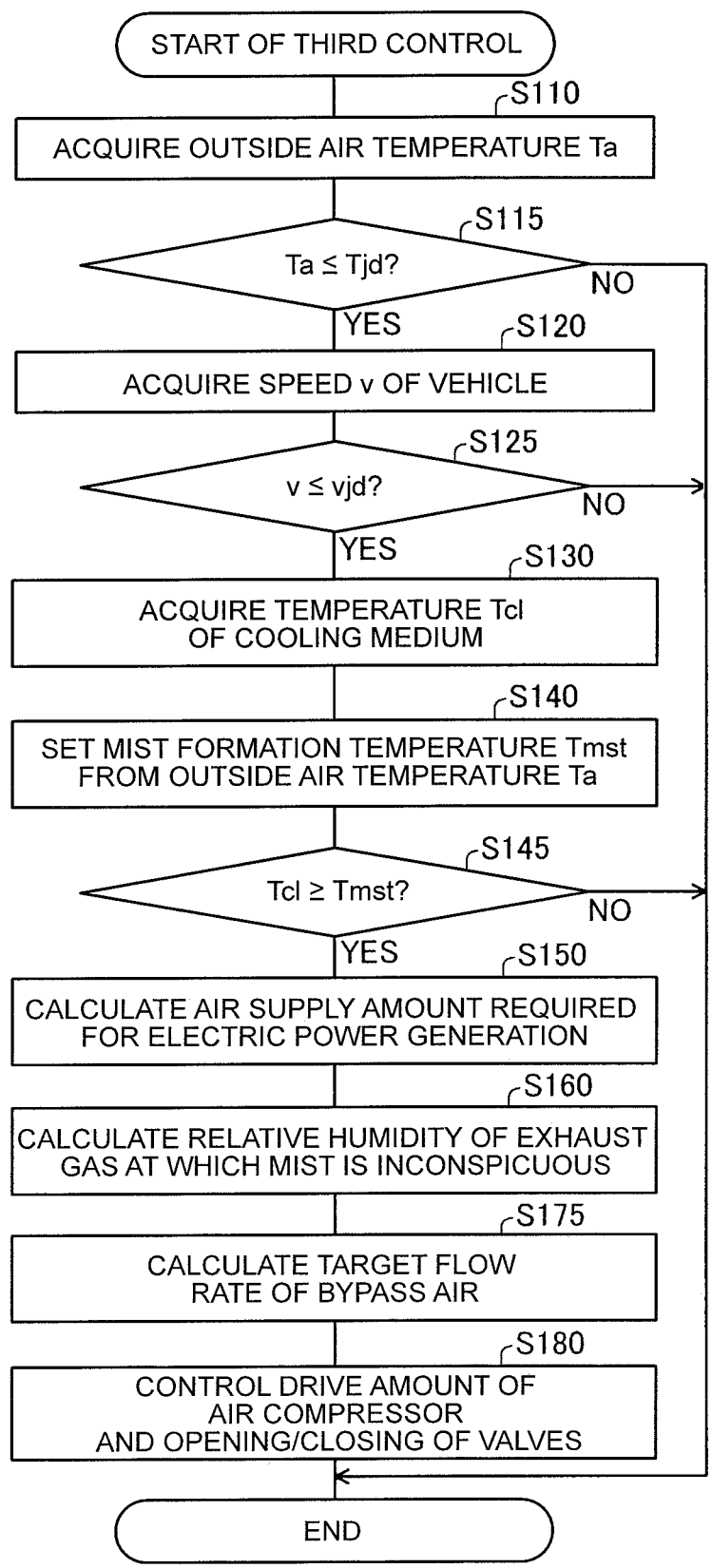
FIG. 7 is a flowchart of control that is performed by a control unit to suppress the formation of mist in the third embodiment.

FIG. 7 is a flowchart of control that is performed by the control unit 110 to suppress the formation of mist in the third embodiment. A process shown in FIG. 7 is repeatedly performed during the driving of the fuel cell-mounted vehicle 10. The control in steps S110, S115, S120, S125, and S130 is the same as the control in steps S110, S115, S120, S125, and S130 of the flowchart of the control in the second embodiment described with reference to FIG. 5, so the description thereof will be omitted.

In step S140, the control unit 110 acquires the mist formation temperature Tmst from the outside air temperature Ta. The mist formation temperature Tmst is a lowest temperature of exhaust gas at which the formation of mist causes a problem for each outside air temperature. That is, the mist formation temperature Tmst is a temperature at which it is determined that mist is formed when it is assumed that the exhaust gas which contains the saturated water vapor amount of water vapor and whose temperature is higher than the mist formation temperature Tmst is discharged to the atmosphere. Accordingly, when the outside air temperature Ta is low, the mist formation temperature Tmst is also low. A relationship between the outside air temperature Ta and the mist formation temperature Tmst is measured and acquired through an experiment or the like, and is stored in the control unit 110 in the form of, for example, a map.

Figure 8:
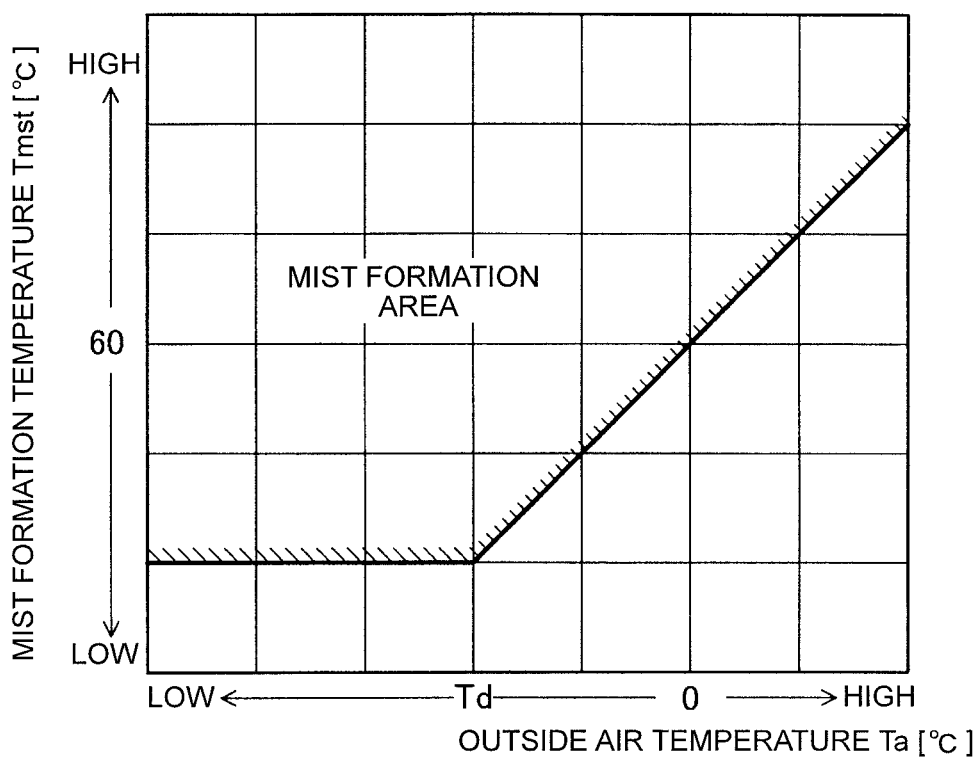
FIG. 8 is an exemplary graph showing a relationship between the outside air temperature Ta and a mist formation temperature Tmst.

FIG. 8 is an exemplary graph showing a relationship between the outside air temperature Ta and the mist formation temperature Tmst. Mist is formed in a region above a line in the graph. The mist formation temperature Tmst falls as the outside air temperature Ta falls. This is because of the following reason. The amount of saturated water vapor decreases as the temperature falls. Therefore, mist is formed unless the absolute humidity of discharged exhaust gas falls as the outside air temperature Ta falls. Incidentally, when the outside air temperature is equal to or lower than Td, the amount of saturated water vapor hardly changes, so the mist formation temperature Tmst is also substantially constant. Besides, when the temperature of exhaust gas is equal to or lower than the mist formation temperature Tmst, the absolute humidity is low, and mist is unlikely to be formed. However, even if mist is formed, the amount thereof is small, and this mist is inconspicuous.

In step S145, the control unit 110 determines whether or not the temperature Tcl of the cooling medium is equal to or higher than the mist formation temperature Tmst. The temperature Tcl of the cooling medium is approximately equal to the temperature of exhaust gas. Therefore, when the temperature Tcl of the cooling medium is lower than the mist formation temperature Tmst, the amount of saturated water vapor in exhaust gas is small, and the absolute humidity is low. Therefore, even when exhaust gas is discharged to the atmosphere, mist is unlikely to be formed. Therefore, the process is ended without performing the control of increasing the flow rate of bypass air. On the other hand, when the temperature Tcl of the cooling medium is equal to or higher than the mist formation temperature Tmst, the control unit 110 makes a transition to step S150 to calculate a supply amount of air required for electric power generation. Step S150 is the same as step S50 of FIG. 3.

Figure 9:
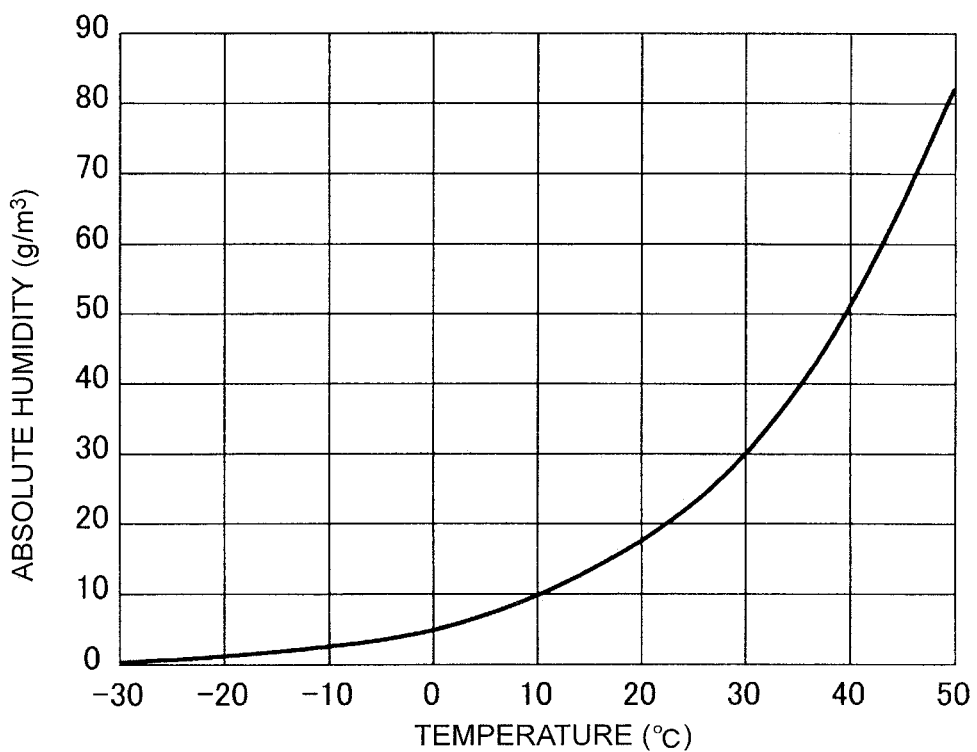
FIG. 9 is a graph showing a saturated water vapor curve.

In step S160, the control unit 110 calculates a relative humidity of exhaust gas at which mist is inconspicuous even when exhaust gas is discharged. First of all, the control unit 110 calculates an amount Wmst of saturated water vapor at the mist formation temperature Tmst. Besides, the control unit 110 calculates an amount Wtcl of saturated water vapor at the temperature Tcl of the cooling medium. FIG. 9 is a graph showing a saturated water vapor curve. The control unit 110 may calculate the amount Wmst of saturated water vapor at the mist formation temperature Tmst or the amount Wtcl of saturated water vapor at the temperature Tcl through the use of the saturated water vapor curve shown in FIG. 9 or an approximation formula such as the Tetens equation or the like.

Subsequently, the control unit 110 calculates RH1=(Wmst/Wtcl)×100. The amount Wmst of saturated water vapor at the time when the temperature of exhaust gas is assumed to be equal to the mist formation temperature Tmst is equal to the absolute humidity of exhaust gas at the temperature Tcl and the relative humidity RH1. When exhaust gas at the temperature Tcl is diluted to a relative humidity lower than RH1, mist is not formed even in the case where exhaust gas is discharged to the atmosphere. Even if mist is formed, this mist is inconspicuous. In this manner, the control unit 110 calculates the relative humidity RH1 of exhaust gas at which mist is inconspicuous, from the amount Wmst of saturated water vapor at the mist formation temperature Tmst and the amount Wtcl of saturated water vapor at the temperature Tcl of the cooling medium.

In step S175, the control unit 110 acquires a target flow rate of bypass air for preventing the formation of mist from exhaust gas. The control unit 110 calculates a multiple k by dividing the amount Wtcl of saturated water vapor by the amount Wmst of saturated water vapor. That is, when exhaust gas is diluted k times, the relative humidity of exhaust gas falls to RH1=(Wmst/Wtcl)×100=(100/k) %. That is, when exhaust gas is diluted k times, the amount of water vapor becomes equal to an amount at which exhaust gas whose temperature is equal to or lower than the mist formation temperature Tmst and which is saturated with water vapor is discharged. In order to dilute exhaust gas k times, the drive amount of the air compressor 330 may be set equal to a drive amount for increasing the flow rate of air to the product of k and the flow rate of air required for electric power generation of the fuel cell 100, and the opening degree of the bypass flow passage adjusting valve 455 may be adjusted to cause the air whose amount has been multiplied by (k−1) to flow through the bypass flow passage 450. In this manner, the control unit 110 acquires the target flow rate of bypass air.

In step S180 as well as step S80, the control unit 110 controls the drive amount of the air compressor 330 and the opening degrees of the stuck inlet valve 350 and the bypass flow passage adjusting valve 455, from the flow rate of air caused to flow through the fuel cell 100 and the flow rate of bypass air caused to flow through the bypass flow passage 450.

As described above, according to the third embodiment, the control unit 110 acquires the temperature of exhaust gas from the temperature Tcl of the cooling medium, acquires the mist formation temperature Tmst corresponding to the outside air temperature Ta, and acquires the flow rate of bypass air caused to flow through the bypass flow passage 450, through the use of the amount Wmst of saturated water vapor at the mist formation temperature Tmst and the amount Wtcl of saturated water vapor at the temperature Tcl of exhaust gas. As a result, the drive amount of the air compressor 330 can be accurately controlled. Consequently, the air compressor 330 is not wastefully driven, and an improvement in fuel economy can be made.

In the third embodiment, the saturated water vapor curve or the approximation formula representing the relationship between the temperature and the amount of saturated water vapor is used to acquire the flow rate of bypass air. When the saturated water vapor curve or the approximation formula representing the relationship between the temperature and the amount of saturated water vapor is used as in the third embodiment, the memory capacity for storing the saturated water vapor curve and the parameters of the approximation formula can be made small.

Other Embodiments

In the second embodiment, the control unit 110 may carry out steps S50, S70, and S80 of FIG. 3 instead of steps S150, S170, and S180 respectively. When the temperature Tcl of the cooling medium is high and mist is likely to be formed, the control unit 110 can perform the control of suppressing the formation of mist or making mist inconspicuous according to the first embodiment. The same map as shown in FIG. 4 can be used in step S50, and the memory capacity for storing the map can be made small.

In each of the aforementioned embodiments, the control unit 110 performs control based on the scaling factor on the assumption that the amount of exhaust gas in performing the mist formation suppression process is the product of k (k−1) and the amount of air required for electric power generation of the fuel cell 100. However, the control unit 110 may control the absolute amount of exhaust gas.

In each of the aforementioned embodiments, the amount of exhaust gas in performing the mist formation suppression process is obtained. However, the control unit 110 may store in advance a map indicating how the outside air temperature Ta and the temperature of exhaust gas (the temperature Tcl of the cooling medium) are related to the rotational speed of the air compressor 330, and obtain the rotational speed of the air compressor 330 from the outside air temperature Ta and the temperature of exhaust gas (the temperature Tcl of the cooling medium). The control unit 110 may store in advance a map indicating how the outside air temperature Ta and the temperature of exhaust gas (the temperature Tcl of the cooling medium) are related to the opening degree of the bypass flow passage adjusting valve 455, and obtain the opening degree of the bypass flow passage adjusting valve 455 from the outside air temperature Ta and the temperature of exhaust gas (the temperature Tcl of the cooling medium).

In each of the aforementioned embodiments, when exhaust gas is diluted, the drive amount of the air compressor 330 for supplying air to the fuel cell 100 is increased, and air is caused to flow through the bypass flow passage 450. However, it is also appropriate to adopt a configuration in which an air compressor for causing air to flow through the bypass flow passage 450 is separately provided and the drive amount of the compressor is changed. The drive amount of the air compressor 330 that supplies air to the fuel cell 100 is not changed, so the relative humidity of exhaust gas can be lowered while holding the flow rate of air supplied to the fuel cell 100 constant.

In each of the aforementioned embodiments, the inter-cooler 340 is provided to hold the temperature of air compressed by the air compressor 330 and the temperature of exhaust gas discharged from the fuel cell 100 approximately equal to each other. However, the inter-cooler 340 can be dispensed with. This is because of the following reason. The air compressed by the air compressor 330 is heated through compression, and the temperature thereof has risen. Therefore, the relative humidity of bypass air can be lowered, and a similar effect is achieved.

Each of the aforementioned embodiments has been described citing the fuel cell-mounted vehicle 10 as an example. However, the disclosure is also applicable to mobile objects other than the fuel cell-mounted vehicle 10, for example, a bus, a truck, a dual-mode vehicle, and a train as well as a passenger automobile mounted with a fuel cell.

The disclosure is not limited to the above-mentioned embodiments or the other embodiments, but can be realized with various configurations within such a range as not to depart from the gist thereof. For example, the technical features in the embodiments and the other embodiments corresponding to the technical features in the respective aspects mentioned in the section of SUMMARY can be appropriately replaced or combined with one another to either partially or entirely solve the above-mentioned problems, or to either partially or entirely achieve the above-mentioned effects. Besides, the technical features can be appropriately deleted unless they are described as being indispensable in the present specification.

What is claimed is:

1. A fuel cell system mounted in a mobile object, comprising:
   an air compressor;
   a fuel cell that is supplied with air from the air compressor;
   an exhaust gas flow passage that discharges exhaust gas from the fuel cell;
   a bypass flow passage that establishes communication between the air compressor and the exhaust gas flow passage;
   a bypass flow passage adjusting valve that adjusts an amount of air supplied to the bypass flow passage;
   an outside air temperature sensor that acquires an outside air temperature;

a speed sensor that acquires a speed of the mobile object; and a control unit that is configured to perform control of the fuel cell system including operation of the fuel cell, wherein the control unit is configured to:

calculate an amount of air required for electric power generation of the fuel cell; and perform a mist formation suppression process for supplying the amount of air required for electric power generation to the fuel cell and increasing a flow rate of air caused to flow through the bypass flow passage by increasing a drive amount of the air compressor and controlling an opening degree of the bypass flow passage adjusting valve when the outside air temperature is equal to or lower than an outside air temperature determination threshold and the speed of the mobile object is equal to or lower than a determination speed, wherein a first flow rate is larger than a second flow rate in the mist formation suppression process, the first flow rate being a flow rate of air flowing through the bypass flow passage at a first temperature that is lower than a second temperature that is equal to or lower than the outside air temperature determination threshold, and the second flow rate being a flow rate of air flowing through the bypass flow passage at the second temperature.

2. The fuel cell system according to claim 1, further comprising:

a temperature acquisition unit that is configured to acquire a temperature of exhaust gas discharged from the fuel cell, wherein the control unit is configured to perform the mist formation suppression process when the outside air temperature is equal to or lower than the outside air temperature determination threshold, the speed of the mobile object is equal to or lower than the determination speed, and the temperature of the exhaust gas is equal to or higher than an exhaust gas temperature determination threshold.

3. The fuel cell system according to claim 2, further comprising:

a temperature sensor that measures a temperature of a cooling medium discharged from the fuel cell, wherein the temperature acquisition unit is configured to acquire a temperature of the exhaust gas through use of the temperature of the cooling medium discharged from the fuel cell.

4. The fuel cell system according to claim 2, wherein the control unit is configured to:

acquire a mist formation temperature as a lowest temperature at which mist is formed when exhaust gas containing a saturated water vapor amount of water vapor is discharged, through use of the outside air temperature;

acquire a target flow rate of air flowing through the bypass flow passage, through use of a ratio between the saturated water vapor amount at the mist formation temperature and the saturated water vapor amount at the temperature of the exhaust gas; and perform the mist formation suppression process.

5. A mobile object mounted with the fuel cell system according to claim 1.

6. An exhaust gas discharge control method for exhaust gas discharged from a mobile object mounted with a fuel cell system, the exhaust gas discharge control method comprising:

acquiring an outside air temperature;

acquiring a speed of the mobile object;

calculating an amount of air required for electric power generation of a fuel cell;

performing a mist formation suppression process for supplying the amount of air required for electric power generation to the fuel cell and increasing a flow rate of air caused to flow through a bypass flow passage by increasing a drive amount of an air compressor configured to supply air to the fuel cell and controlling an opening degree of a bypass flow passage adjusting valve, such that a first flow rate becomes larger than a second flow rate, when the outside air temperature is equal to or lower than an outside air temperature determination threshold and the speed of the mobile object is equal to or lower than a determination speed, wherein the first flow rate is a flow rate of the air flowing through the bypass flow passage at a first temperature that is lower than a second temperature that is equal to or lower than the outside air temperature determination threshold, the second flow rate is a flow rate of the air flowing through the bypass flow passage at the second temperature, and the bypass flow passage establishes communication between the air compressor and an exhaust gas flow passage from which exhaust gas from the fuel cell is discharged; and mixing and discharging the air and the exhaust gas discharged from the fuel cell.

7. The exhaust gas discharge control method according to claim 6, further comprising:

acquiring a temperature of the exhaust gas discharged from the fuel cell; and performing the mist formation suppression process when the outside air temperature is equal to or lower than the outside air temperature determination threshold, the speed of the mobile object is equal to or lower than the determination speed, and the temperature of the exhaust gas is equal to or higher than an exhaust gas temperature determination threshold.

8. The exhaust gas discharge control method according to claim 7, wherein the temperature of the exhaust gas is acquired through use of a temperature measured by a temperature sensor that measures a temperature of a cooling medium discharged from the fuel cell.

9. The exhaust gas discharge control method according to claim 7, wherein a mist formation temperature as a lowest temperature at which mist is formed when exhaust gas containing a saturated water vapor amount of water vapor is discharged is acquired from the outside air temperature, and a target flow rate of the air flowing through the bypass flow passage is acquired through use of a ratio between the saturated water vapor amount at the mist formation temperature and the saturated water vapor amount at the temperature of the exhaust gas, and the mist formation suppression process is performed.

10. The fuel cell system according to claim 1, wherein the amount of air supplied to the bypass flow passage is not changed when the outside air temperature is equal to or less than a predetermined temperature that is lower than the outside air temperature determination threshold.

* * * * *